July 18, 1933.  E. P. RENAUX ET AL  1,918,667
CONTROLLING MECHANISM
Filed July 21, 1931  4 Sheets-Sheet 3

E. P. Renaux
L. J. Renaux
INVENTORS
By Marks & Clerk
Attys.

Patented July 18, 1933

1,918,667

UNITED STATES PATENT OFFICE

EUGÈNE PROSPER RENAUX, OF PARIS, AND LUCIEN JULES RENAUX, OF LIVRY-GARGAN, FRANCE

CONTROLLING MECHANISM

Application filed July 21, 1931, Serial No. 552,278, and in France August 1, 1930.

Many mechanical driving gears, and in particular those adapted to be used for the steering of automobile vehicles, are being constantly studied in order to improve their precision and safety.

One of the chief drawbacks of said gears is the rapidity with which they work loose. Particularly in the case of steering gears for automobiles, as soon as backlash has begun to appear in the gear, either in the ordinary worm and sector or worm and nut types, or in other types, the steering system becomes loose, unreliable and even dangerous, loses its quality of relative irreversibility, and the so-called "shimmy" effects develope freely.

Our invention relates to driving gears and in particular to steering gears for automobiles, and its object is to do away with the effects of backlash by doing away with their cause, that is by allowing no play to develope in the gear.

According to a characteristic of my invention, the organ to be driven (drag link or other piece), is connected, either directly or not, and through the medium of one or several elastic devices, to two organs adapted to be driven alternately, according to the direction of the displacement to be produced, by any suitable actuating device in contact with which they are constantly maintained without play by the above mentioned elastic devices.

Other characteristics will result from the following description of preferred embodiments of our invention with reference to the accompanying drawings, given merely by way of example and in which.

Figure 1:
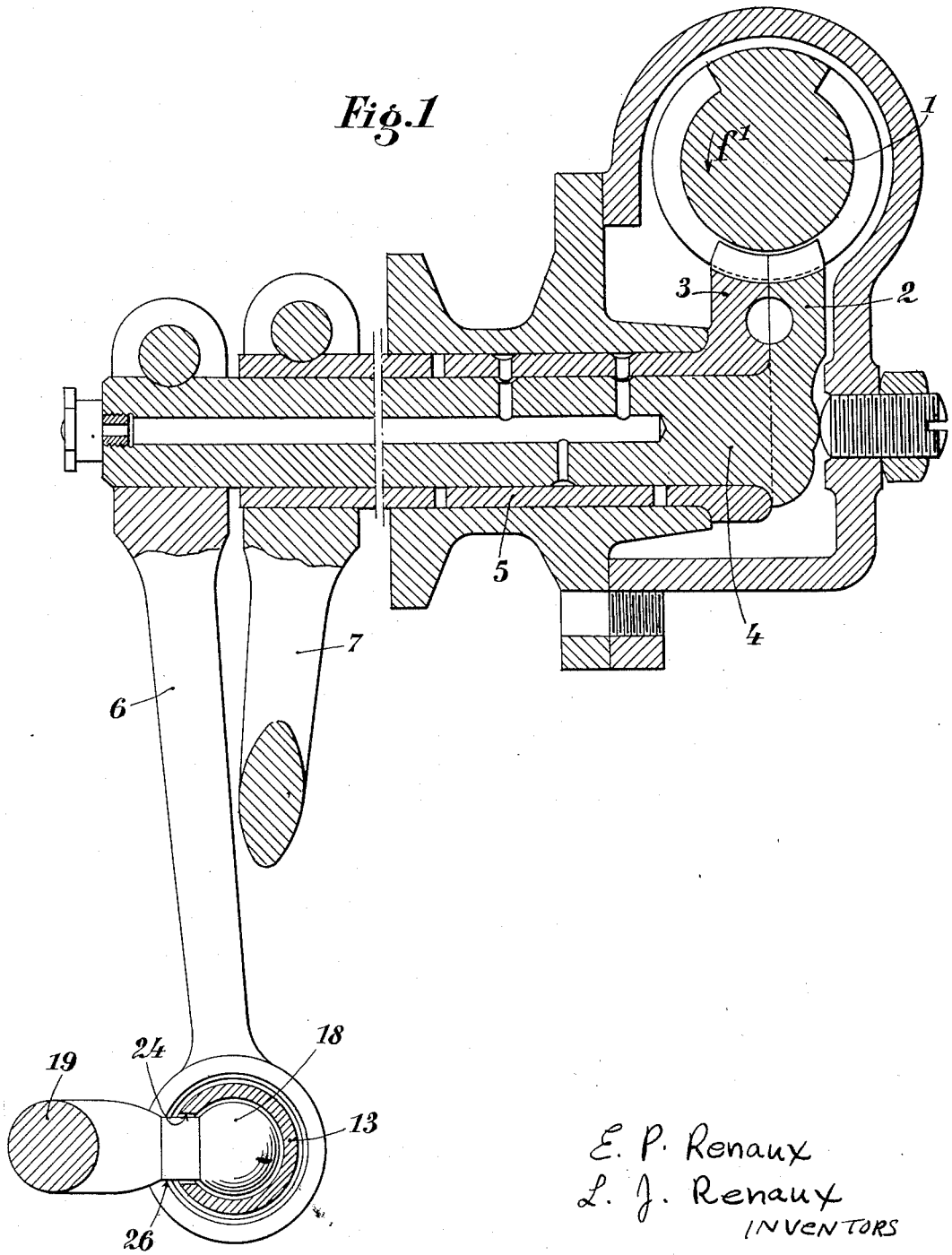
Fig. 1 is a longitudinal vertical view in section of a steering gear for an automobile vehicle, of the worm and sector type, according to our invention.
Figure 2:
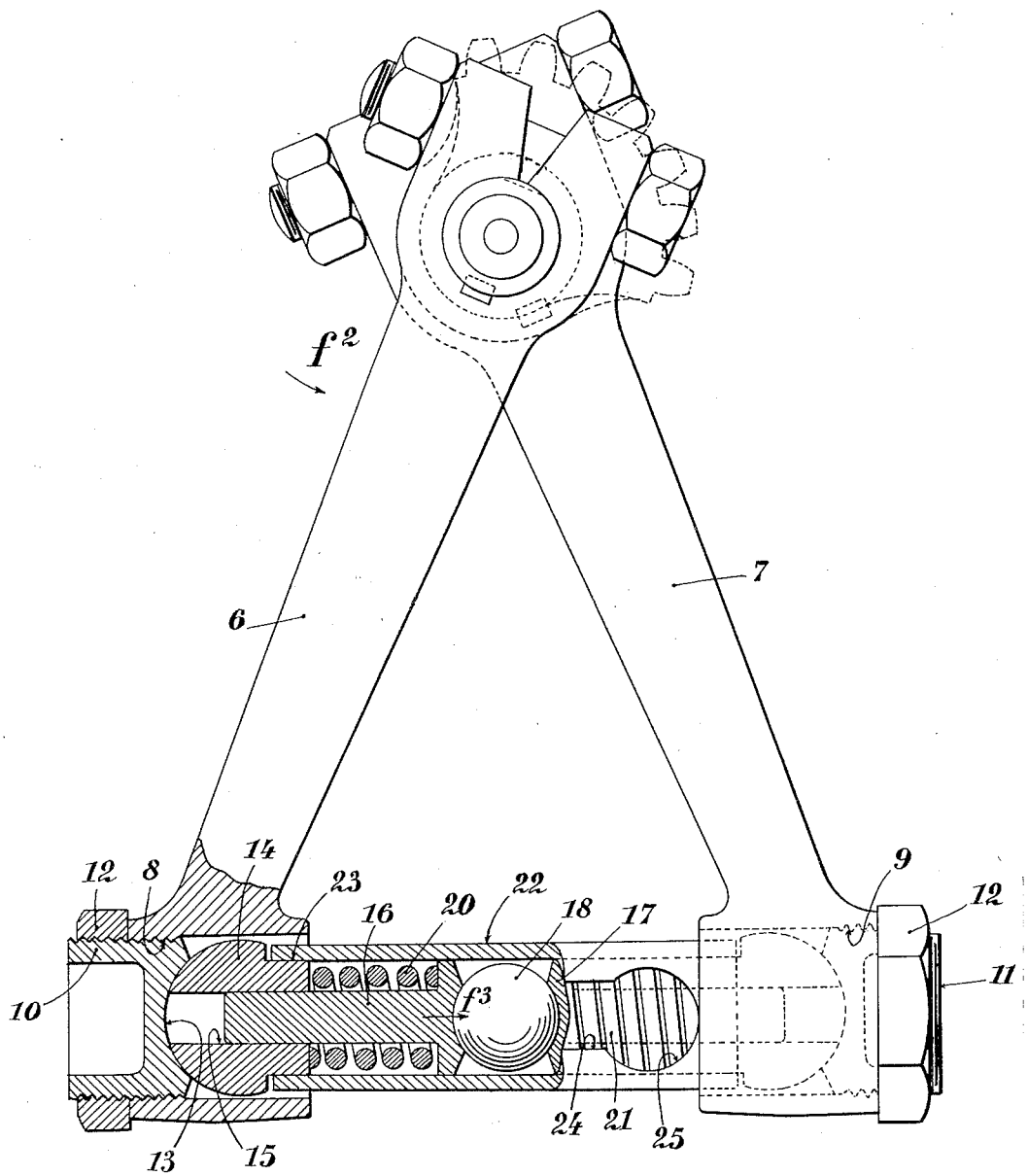
Fig. 2 is a corresponding side view, some parts being cut away for the sake of clearness.

In the embodiment shown in Fig. 1 and Fig. 2 an endless screw or worm 1 is in mesh with two independent half-sectors 2 and 3 disposed side by side. Sector 2 is integral with central spindle 4 and sector 3 is integral with sleeve 5 coaxial with spindle 4 and mounted loose thereon.

Two levers 6 and 7 are rigidly secured, through suitable keys or other means, to the extremities of spindle 4 and sleeve 5 respectively, the lengths of said spindle and sleeve being suitably chosen.

The ends of levers 6 and 7 are screw threaded at 8 and 9 respectively (Fig. 2), so as to receive hollow nuts 10 and 11 respectively, which are locked by means of nuts 12.

Ball shaped pieces 14 are adapted to engage spherical recesses 13 provided in hollow nuts 10 and 11. Said pieces 14 are provided with axial bores 15 adapted to receive the sliding tails of push pieces 16 and 17 the spherically recessed heads of which tightly fit on either side of the usual spherical member 18 of drag link 19. Springs 20 and 21 which are in compression are provided around the tails of push pieces 16 and 17, said springs being interposed between pieces 14 and the heads of said push pieces. The whole of said push-pieces and springs is placed within a cylindrical sleeve 22 engaging the cylindrical shoulders 23 of pieces 14.

A longitudinal slot 24 and a circular aperture 25 make it possible to introduce in the usual way the spherical member 18 of drag link 19 into cylinder 22 and allow said member to move within said cylinder toward either of pieces 14, owing to a neck 26 provided between spherical member 18 and link 19 (Fig. 1).

The operation of that device is as follows: When worm screw 1 is rotated in the direction of arrow $f^1$ (Fig. 1) through the driving device connected to the axis of said screw, the two half-sectors 2 and 3 are rotated together in the direction of arrow $f^2$ (Fig. 2) and levers 6 and 7 rotated about their common axis. Lever 6 then exerts a positive action on the whole of the ball and socket device contained within tube 22, that is to say it pushes, through hollow nut 10, piece 14, which in turn pushes spring 20. Said spring acts in turn upon push piece 16 which is in contact with spherical member 18 of drag link 19.

During that motion which drives drag link 19 in the direction of arrow $f^3$ (Fig. 2), spring 21, which is applied against push piece 17 pushes the right hand piece 14 (Fig. 2) against hollow nut 11 of lever 7, which lever rotates about its axis in the direction of arrow $f^2$ and is stopped in that motion only when the teeth of sector 3, with which it is integral, are applied against screw 1 (Fig. 1).

Lever 7 and sector 3 with which it is integral have therefore made no effective work. They have merely followed the movement of the whole device in such manner as to be always in tight contact with screw 1. Therefore, upon screw 1 being rotated in the opposite direction to that above described, lever 7 will immediately operate without backlash, exactly in the same manner as above explained concerning lever 6, and sector 2, which cooperates with lever 6, will be kept in tight contact with screw 1 during its negative displacement.

It will be readily understood that the antagonistic efforts exerted by springs 20 and 21 will tend to push the extremities of levers 6 and 7 in opposite directions.

It results therefrom that, as each of these levers is integral with one of the half-sectors 2 and 3 respectively, each half-sector will be constantly strongly applied against worm 1, thus balancing the pressures exerted on the longitudinal axis of said worm 1.

The many advantages of this arrangement will be readily appreciated since it also makes it possible to automatically take up the play resulting from normal wear of the moving pieces, and, by avoiding the jarring reactions caused by said play, it prevents the rapid wear and tear of said pieces.

Furthermore, the tolerances allowed in the manufacturing of these pieces may be considerably increased without any harm.

It should be noted that the whole system including the springs and the ball and socket joint slides freely within tube 22, which provides for the pieces being held in position, even in the case of one of the springs getting broken.

Figure 3:
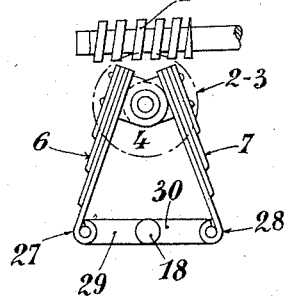
Fig. 3 is an elevational view of a different embodiment of our invention.
Figure 4:
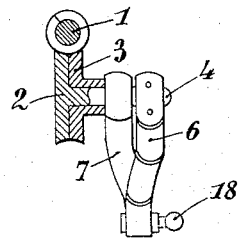
Fig. 4 is a corresponding sectional view.

In Figs. 3 and 4 we have shown another embodiment in which levers 6 and 7 consist of leaf springs which play the part of springs 20 and 21. In that case, the eyes 27 and 28 of said springs are connected through a cross member 29 having a suitable length for ensuring the necessary tensioning of the leaf springs. Spherical member 18 is secured to said cross member 29.

Figure 5:
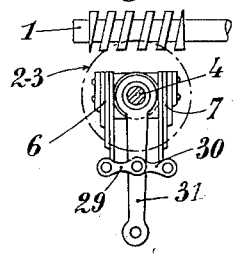
Fig. 5 is an elevational view of another embodiment.
Figure 6:
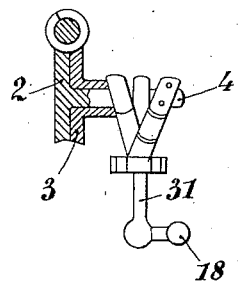
Fig. 6 is a corresponding sectional view.

In the embodiment shown in Figs. 5 and 6, spherical member 18 is carried by a lever 31 mounted loose on spindle 4 about the axis of which spring levers 6 and 7 can rotate.

The steering gear, instead of being of the worm and sector type, might as well be of the worm and nut type.

Figure 7:
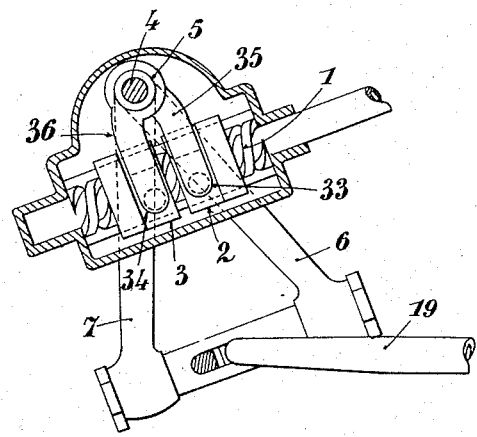
Fig. 7 is an elevational view of a steering gear for automobiles of the worm and nut type, according to our invention.

In that case, two nuts 2 and 3 (Fig. 7) are mounted on screw 1. Two levers 35 and 36 keyed on spindle 4 and sleeve 5 are pivoted at 33 and 34 to said nuts 2 and 3 respectively. Levers 6 and 7 are also keyed on said spindle 4 and sleeve 5 respectively. The connection between said levers 6 and 7 and drag link 19 is the same as that shown in Figs. 1 and 2.

Figure 8:
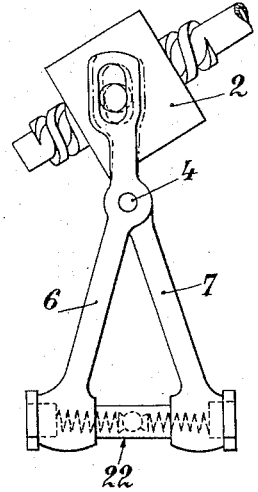
Fig. 8 is a similar view showing a different embodiment.
Figure 9:
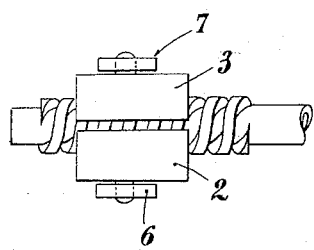
Fig. 9 is a top view of said embodiment.

In Figs. 8 and 9 we have shown another embodiment in which levers 6 and 7 (which are connected to the drag link in the same manner as in the two first examples) are jointed about an axis 4 and are integral with two half-nuts 2 and 3 respectively. The operation is the same as in the preceding example.

Figure 10:
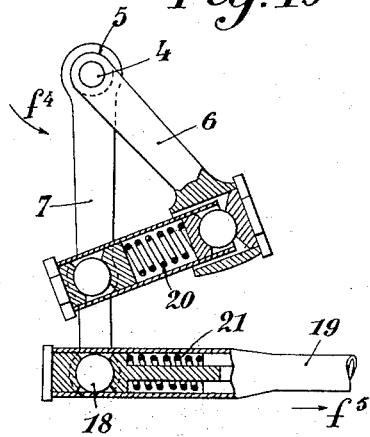
Fig. 10 is an elevational view of a different embodiment of the elastic connection provided between the organ to be driven and the intermediate organs, which are in turn connected to the sectors or nuts in mesh with the driving organ.

The connection between levers 6 and 7 and drag link 19 might also be made as shown in Fig. 10. According to that embodiment of our invention, lever 7 actuates in a known manner, through the medium of a spring 21, drag link 19. As for lever 6, it is connected to lever 7 through the medium of a spring 20 which is in compression.

The operation of that embodiment of our device is as follows: When levers 6 and 7 are driven in the direction of arrow $f^4$, lever 7 acts directly upon bar 19 in the direction of arrow $f^5$, and lever 6 follows the movement, spring 20 doing away with any play. When levers 6 and 7 rotate in the direction opposite to that of arrow $f^4$, lever 6 acts upon lever 7 through the intermediary of spring 20, and lever 7 directly actuates link 19 in the direction opposite to that of arrow $f^5$. Spring 20 also prevents any play between nut 3 and screw 1.

Figure 11:
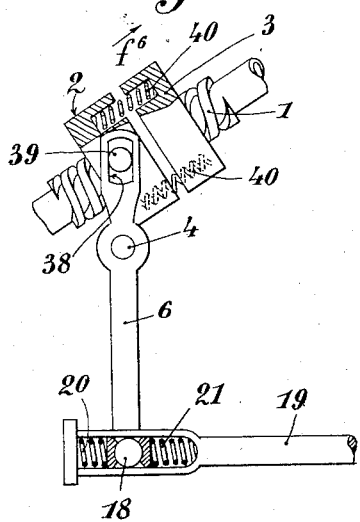
Fig. 11 is an elevational view of another embodiment of our invention, in which the two nuts in mesh with the worm are elastically connected to each other.

In Fig. 11 we have shown another embodiment in which drag link 19 is connected only to one lever through two springs 20 and 21. Said lever 6 swings about an axis 4 and is connected through a slot 38 to a trunnion 39 carried by a nut 2. Said nut is connected through springs 40 to another nut 3. Nuts 2 and 3 are screwed on screw 1.

Figure 12:
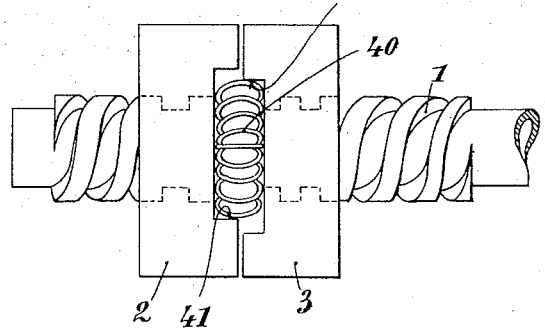
Fig. 12 shows another embodiment of the device shown in Fig. 11.

Of course, springs 40, instead of being parallel to screw 1 might be concentric with said screw as shown in Fig. 12. In that case, each spring 40 is applied at one of its extremities against a shoulder 41 of nut 2, and at the other extremity against a shoulder 42 of nut 3.

The operation is as follows: When screw 1 rotates in such manner that nuts 2 and 3 move in the direction of arrow $f^6$, nut 2 directly drives lever 6 and springs 40 bear against nut 3 and prevent any play between said nut 3 and screw 1. When, on the contrary, the nuts move in the direction opposite to that of arrow $f^6$, nut 3, driven by the screw, acts, through springs 40, upon screw 2 and eliminates any possible play between said nut and screw 1, while operating lever 36.

While we have disclosed what we deem to be preferred embodiments of our invention, it should be well understood that we do not wish to be limited thereto as there might be changes made in the arrangement disposition and form of the parts without departing from the principle of our invention as comprehended within the scope of the appended claims.

What we claim is:

1. In a transmission device, a driving screw, two driven members provided with screw threaded portions engaging said screw and adapted to be moved both in the same direction when said screw is rotated, two pivoted levers operatively connected with said two driven members respectively and adapted to move said two driven members in opposite directions along the screw when said levers are turned away from each other, spring means interposed between said pivoted levers and adapted to urge said levers away from each other, and mechanism adapted to be operated and connected with said levers.

2. In a transmission device, a driving screw, two shafts fitting into each other and freely rotatable on each other, two driven members carried on said two shafts respectively and provided with screw threaded portions engaging said screw so as to be moved in the same direction when said screw is rotated, two levers also carried on said two shafts respectively, spring means interposed between said pivoted levers and adapted to urge said levers away from each other, and mechanism adapted to be operated and connected with said levers.

3. In a transmission device, a driving screw, two driven members provided with screw threaded portions engaging said screw and adapted to be moved both in the same direction when said screw is rotated, two pivoted levers operatively connected with said two driven members respectively and adapted to move said two driven members in opposite directions along the screw when said levers are turned away from each other, a connecting member for a mechanism adapted to be driven interposed between said two levers, and spring means interposed between said connecting member and each of said levers respectively and adapted to urge said levers away from each other.

4. In a transmission device, a driving worm screw, two toothed sectors engaging said worm screw and adapted to be turned in the same direction when said worm screw is rotated, two pivoted levers connected with said two sectors respectively and adapted to turn said two sectors in opposite directions when said levers are turned away from each other, spring means interposed between said pivoted levers and adapted to urge said levers away from each other, and mechanism adapted to be operated and connected with said levers.

EUGÈNE PROSPER RENAUX.
LUCIEN JULES RENAUX.